Patented Feb. 7, 1950

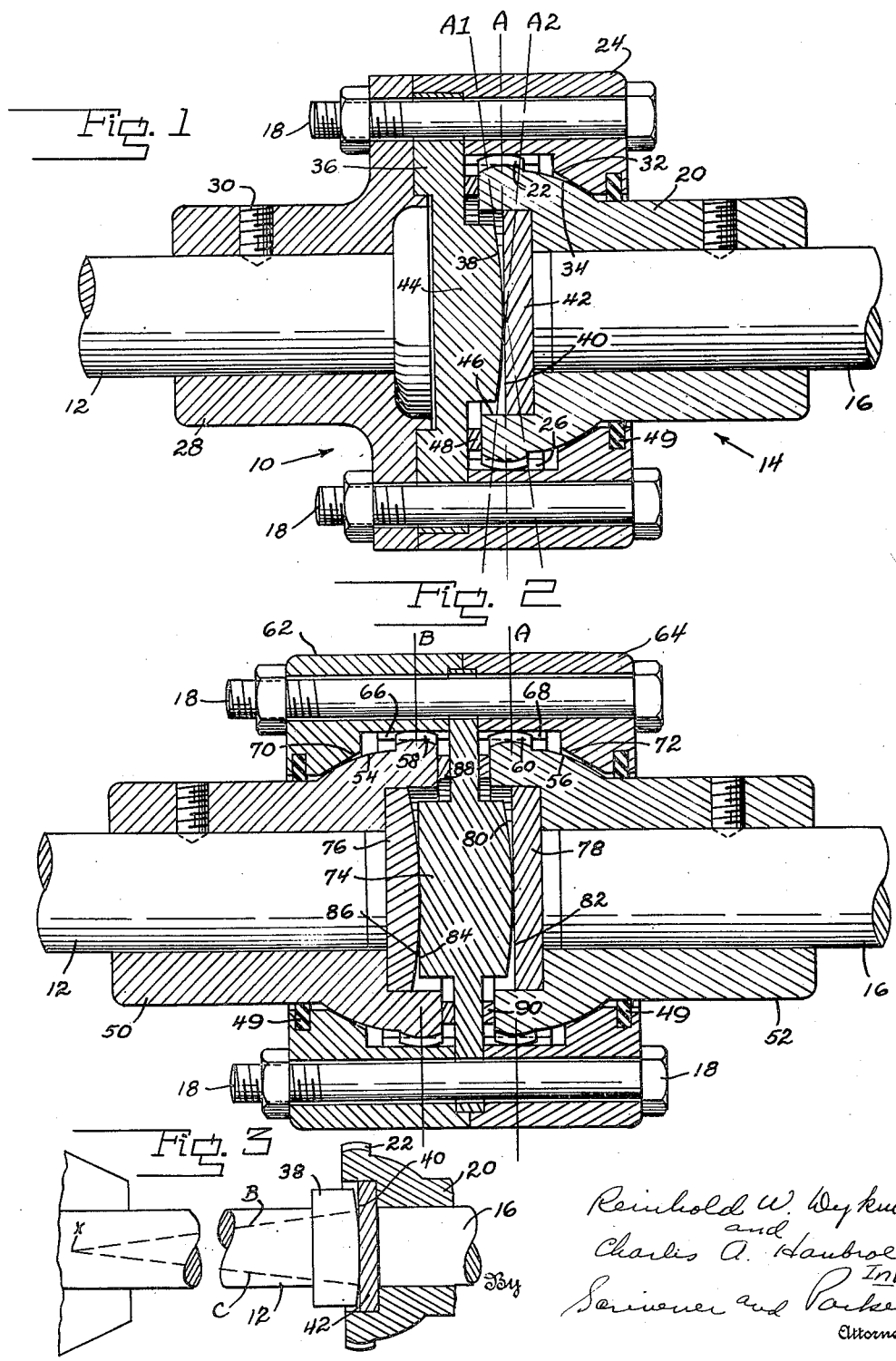

2,496,702

UNITED STATES PATENT OFFICE 2,496,702

FLEXIBLE COUPLING

Reinhold W. Dykman and Charles A. Haubroe, Baltimore, Md., assignors, by mesne assignments, to Dykman Manufacturing Corporation, Baltimore, Md., a corporation of Maryland Application February 10, 1948, Serial No. 7,348

6 Claims. (Cl. 64—9)

This invention relates to flexible couplings for connecting a driving shaft with a driven shaft, and more particularly to couplings of the character wherein end thrust may be transmitted in both directions without end play, and while permitting the transmission of rotary motion accompanied by shaft misalignment.

Couplings of the above type have heretofore been extensively used in marine installations where it is necessary that the coupling compensate for slight misalignment of the engine and propeller shafts and wherein the transmission of end thrust in both directions is required without end play of the shafts or coupling parts. It has been found, however, that during operation of the prior couplings, the center of thrust changes during variations in the alignment of the coupling parts. This change in the center of thrust develops what is termed a beam thrust or beam deflection which occurs adjacent the bearings ahead of the coupling, and which imposes serious unbalanced loads and vibrations on such bearings. These loads cause great damage to the bearings, especially when the coupling is operating in misaligned condition and at a relatively high speed for the transmission of a substantial end thrust, as in the case of a marine propeller drive.

In addition to the above, the construction of the prior couplings has been such that during transmission of end thrust with the coupling parts misaligned, these parts develop a relative skidding or slipping action which causes objectionable wear thereof due to the problems of lubrication.

It is accordingly the principal object of the present invention to provide a flexible coupling which is so constructed and arranged as to avoid the aforementioned objections and disadvantages.

Another object is to provide a flexible coupling of the spherical gear type having a novel construction permitting transmission of end thrust, during shaft misalignment, while maintaining the center of thrust unchanged, to thereby eliminate all beam thrust and lateral vibration loads upon the bearings adjacent the coupling.

A further object resides in the provision of a flexible coupling of the above type which incorporates a novel construction for eliminating relative skidding or slipping between the coupling parts while in operation.

Still another object comprehends a novel arrangement which insures a compact structure which may be readily lubricated and which is highly efficient in operation over long periods of time.

Other objects and novel features of the invention will appear more fully hereinafter from the following detailed description when taken in connection with the accompanying drawing, which illustrates two embodiments of the invention. It will be expressly understood however, that the drawing is utilized for purposes of illustration only, and is not to be taken as a definition of the limits of the invention, reference being had for this latter purpose to the appended claims.

Referring to the drawing, wherein similar reference characters refer to similar parts throughout the several views;

Fig. 1 is an axial sectional view of a flexible coupling embodying the principles of the present invention, and which functions to transmit end thrust in both directions during angular shaft misalignment;

Fig. 2 is an axial sectional view of a modified form of flexible coupling which functions to transmit end thrust in both directions during both angular and offset, parallel misalignment of the shafts, and Fig. 3 is a diagrammatic view illustrating the operation of the invention in maintaining the center of thrust constant irrespective of variations in the misalignment angles.

Referring more particularly to Fig. 1, a flexible coupling constructed in accordance with the present invention is illustrated therein as including a driving member 10, adapted to be secured to a driving shaft 12, together with a driven member 14 rigidly connected with a driven shaft 16, these members being connected together in a manner to be more specially described hereinafter, by means including a plurality of bolts 18, two of which are shown. While it is contemplated that the coupling of the present invention may be particularly adapted for marine installations, in which case the driving shaft 12 is connected with the engine shaft while the driven shaft 16 is connected with the propeller shaft, still it will be understood that the coupling is not limited to such use, but may be employed in any installation where misalignment may occur and where it is desired to transmit end thrust in one or both directions.

More particularly, and as shown, the coupling of Fig. 1 is of the spherical gear type wherein the driven member 14 comprises a hub 20 having formed thereon, a spherical gear 22 including an annular series of curved teeth. The driving member 10 includes a housing 24 which surrounds the end of hub 20, and which is so formed as to provide an internal gear 26 which meshes with the spherical gear 22. Thus a rocking movement is permitted between the hub 20 and the housing 24 to allow torque transmission during angular misalignment of these parts. As annular coupling flange 28 is secured to the driving shaft 12, as by a set screw 30, and this flange and the housing 24 are firmly secured together by the annular series of bolts 18.

In order to prevent any end play between the driving member 10 and the driven member 14 in a direction tending to move these members away from each other, the said members are provided with cooperating means including an angularly directed surface 32 on the housing 24, and a spherical surface 34 on the hub 20. With this arrangement, end play between the driven and driving members during transmission of end thrust in one direction is entirely eliminated.

As heretofore stated, one of the principal features of the invention resides in an arrangement for preventing the shifting of the center of thrust of the coupling during variations in the angle of misalignment of the coupling parts and the shafts connected thereto. In the form of the invention illustrated in Fig. 1, the above novel result is secured by the utilization of a thrust element 36 having a spherical or convex thrust face 38 in engagement with the flat thrust face 40 of a thrust button 42. More particularly, the element 36 is annular in form and is firmly clamped by the bolts 18 between the flange 28 and the housing 24. The central portion of the element 36 may be enlarged at 44, as shown, and the convex face 38 is so arranged as to be symmetrical about the longitudinal axis of the coupling. The thrust button 42 is preferably carried within a recess or cavity 46 formed in the end of the hub 20, and the construction is such that when the driving and driven members 10 and 14 of the coupling are assembled with no misalignment, the surfaces 38 and 40 contact each other at a point which lies upon the longitudinal axis of the coupling. It will also be seen that the contact point between the two thrust faces lies within the median plane A of the spherical gear 22, such plane being defined as the plane which passes through all the spherical gear teeth midway between the ends thereof. As will appear more fully hereinafter, when misalignment occurs and the median plane passes from A1 to A2, for example, the position of the contact point between the thrust faces 38 and 40 shifts, but will always remain in the said median plane.

The center of thrust of the coupling is determined by the radius of curvature of the convex surface 38 and may vary with different types of installations. In the example shown in Fig. 3, the radius of curvature of surfaces 38 is denoted by the line B having a center at X, the latter constituting the center of thrust, regardless of the misalignment angle of the coupling. It will be understood that the spherical curvature of the thrust face 38 may be such that the center of thrust will be located at the desired point to eliminate beam thrust and lateral vibrations exerted upon the thrust bearings of the engine drive shaft 12. For example, if the drive shaft is supported by a single thrust bearing in the transmission located forwardly of the coupling, the center of thrust may be coincident with the center of such bearing. If two axially spaced bearings are used, the center of thrust may be placed intermediate these bearings. Wherever placed, the construction is such that the thrust center will not change in position, and thus the disadvantages of the prior art are wholly avoided.

While the coupling heretofore described will efficiently transmit rotary motion and end thrust in both directions between shafts which are misaligned, still it is highly desirable in making the initial installation, to have the driving and driven shafts in precise alignment if possible. To this end, a novel arrangement is provided for making the coupling rigid in order to secure precise shaft alignment when initially installing the coupling. More particularly, it will be noted that by reason of the spherical gear 22 and the internal gear 26, the driven hub and the driving housing may rock with respect to each other. To make the coupling rigid, a ring 48 is temporarily interposed between opposing faces of the hub 20 and the thrust element 36 during assembly of the coupling. Hence with the parts so assembled, the driving and driven shafts may be precisely aligned, following which, the ring 48 is removed and the coupling reassembled on the shafts for power transmission in an aligned or misaligned condition.

In operation, it will be understood that the coupling is assembled on the shafts 12 and 16 in the manner shown in Fig. 1, after the preliminary alignment step previously described, and after the removal of the ring 48. A suitable lubricant is contained within the coupling and to render the latter water, oil and dust tight, a suitable packing seal 49 is interposed between the housing 24 and the hub 20. It will also be understood that the convex thrust surface 38 is so chosen as to bring the center of thrust at the desired point along the length of the driving shaft, as heretofore described.

In the event any misalignment occurs during the transmission of rotary power through the coupling, the rocking motion between the members 10 and 14, permitted by the cooperation of the spherical gear 22 and the internal gear 26 insures efficient torque transmission from one shaft to the other. Should the end thrust be in a direction to separate the members 10 and 14, there will be no play in the coupling by reason of the cooperation between surfaces 32 and 34. Likewise, because of the constant point engagement between the thrust surfaces 38 and 40, there will be no end play of the parts upon a reversal of thrust, as in the case where the driven shaft 16 is connected with a propeller, and the drive is reversed.

As will be clear from Figs. 1 and 3, should the coupling misalign in any direction from direct alignment, the line of action of the thrust will be along lines such as B or C which converge at the center of thrust X. For example, when the coupling misaligns to position A1 of Fig. 1, the line of thrust will be along line B of Fig. 3. Likewise when position A2 is reached, the line of thrust will be along line C. Thus no change will occur in the center of thrust during coupling misalignment, this being due to the novel construction including the thrust faces 38 and 40, and the location of the contact point therebetween in the median plane of the spherical gear 22. Also during operation, there will be no relative skidding or sliding action of the coupling parts to cause lubrication difficulties and excessive wear of the parts.

A modified form of the invention is illustrated in Fig. 2 wherein the coupling parts associated with the driven shaft 16 of Fig. 1 have been duplicated for the driving shaft, this arrangement allowing offset parallel misalignment as well as angular shaft misalignment. As shown, the driving shaft 12 has a driving hub 50 secured thereto, while the driven shaft 16 has a similar driven hub 52 fixed thereon to rotate therewith. Each of these hubs may be formed like the hub 20 of Fig. 1 and respectively include spherical surfaces 54 and 56, and spherical gears 58 and 60. Housing elements 62 and 64 surround the respective hubs 50 and 52 and all of the above named parts are firmly coupled together, as by means of a plurality of bolts 18. It will be noted that the housing elements 62 and 64 are formed to provide internal gears 66 and 68, which cooperate with the spherical gears 58 and 60 respectively, and are also formed to include angularly directed surfaces 70 and 72 which coact with the respective spherical surfaces 54 and 56 to allow relative rocking movement of the parts and to prevent end play when the thrust is in one direction.

In order to transmit thrust in the other direction so that the center of thrust remains fixed, regardless of coupling misalignment, a thrust element 74 is interposed between thrust buttons 76 and 78 which are respectively carried by the hubs 50 and 52. More particularly, the element 74 is provided with a spherical or convex thrust face 80 which has a point engagement with a flat thrust face 82 of the thrust button 78, and which point lies within the median plane A of the spherical gear 60, as in Fig. 1. The other side of the thrust element 74 is provided with a flat thrust face 84 which has a point contact with a convex thrust face 86 of the thrust button 76, the contact point lying within the median plane B of the spherical gear 58. It will be understood that the center of curvature of both the faces 80 and 86 is a common point positioned on the axis of shaft 12 at the desired location ahead of the coupling, in order that the center of thrust be unchanged during operation.

Operation of the form shown in Fig. 2 is similar to that of Fig. 1 except that in the former, the use of two spherical gears instead of one enables the shafts 12 and 16 to operate in offset parallel misalignment as well as angular misalignment. When installing the coupling, the parts may be made rigid by use of the rings 88 and 90, in order to allow precise alignment of the driving and driven shafts. After the latter operation, the rings are removed and the coupling assembled with the shafts.

While two embodiments of the invention have been shown and described herein, it will be understood by those skilled in the art that various modifications may be resorted to without departing from the spirit of the invention. Reference will therefore be had to the appended claims for a definition of the invention.

What is claimed is:

1. A flexible shaft coupling for transmitting rotation and end thrust from one shaft to another, comprising driving and driven hub members adapted to be respectively connected with said shafts, each of said members having a spherical gear formed thereon, an external sleeve having a pair of internal gears carried thereby and respectively engaging said spherical gears, said sleeve having means formed thereon and engaging said hub members for preventing longitudinal movement of the hub members away from each other, and means interposed between the ends of the hub members for preventing longitudinal movement of said members toward each other and for transmitting end thrust from one member to the other, comprising a pair of spaced-apart thrust elements respectively supported by said hub members, one element provided with a convex thrust face and the other element provided with a flat thrust face, and a third thrust element supported by said sleeve and having a flat thrust face engaging the convex thrust face of the one element, and having also a convex thrust face engaging the flat thrust face of the other element.

2. A flexible shaft coupling as set forth in claim 1 wherein the flat thrust face of said other element lies in a plane which passes through the center of one of said spherical gears midway between the ends of the teeth thereof, and upon axial alignment of said hub members, the flat thrust face of the third thrust element lies in a plane which passes through the center of the other spherical gear midway between the ends of the teeth thereof.

3. A flexible shaft coupling for transmitting rotation and end thrust from one shaft to another, comprising a driven member having a spherical gear formed thereon, a driving member having an internal gear meshing with said spherical gear, cooperating means connected to said driving and driven members preventing relative longitudinal movement of said members away from each other, and means to transmit end thrust from one member to another while permitting misalignment thereof, comprising a thrust element supported by one member and provided with a convex thrust face, and a second thrust element supported by the other member and provided with a flat thrust face engaging the convex thrust face to provide a point contact therebetween, said point contact between said convex and flat thrust faces lying in the plane which passes through the center of said spherical gear midway between the ends of the teeth thereof.

4. A flexible shaft coupling for transmitting rotation and end thrust from one shaft to another, comprising a driven member having a spherical gear formed thereon, a driving member having an internal gear meshing with said spherical gear, cooperating means connected to said driving and driven members preventing relative longitudinal movement of said members away from each other, and means to transmit end thrust from one member to another while permitting misalignment thereof, comprising a thrust element carried by the driving member and provided with an enlarged central portion having a convex thrust face symmetrically disposed with respect to the axis of said members, and a second thrust element supported by the driven member and provided with a flat thrust face engaging the convex thrust face to provide a point contact therebetween, said point contact between said convex and flat thrust faces lying in the plane which passes through the center of said spherical gear midway between the ends of the teeth thereof.

5. A flexible shaft coupling for transmitting rotation and end thrust from one shaft to another comprising a driven member having a spherical gear formed thereon, a driving member having an internal gear meshing with said spherical gear, cooperating means connected to said driving and driven members preventing relative longitudinal movement of said members away from each other, and means to transmit end thrust from one member to another while permitting misalignment thereof, comprising a thrust element carried by the driving member and provided with an enlarged central portion having a convex thrust face symmetrically disposed with respect to the axis of said members, and a second thrust element carried within a cavity formed within the end of the driven member radially inwardly of said spherical gear, said second element provided with a flat thrust face engaging the convex thrust face to provide a point contact therebetween, said point contact between said convex and flat thrust faces lying in the plane which passes through the center of said spherical gear midway between the ends of the teeth thereof.

6. A flexible shaft coupling for transmitting rotation and end thrust from one shaft to another, comprising a driven hub having a spherical gear formed thereon, a driving member including a housing having an internal gear meshing with said spherical gear, cooperating means on said hub and housing for preventing longitudinal movement of said members away from each other while allowing misalignment thereof, and means for preventing longitudinal movement of said members toward each other and for transmitting end thrust from one member to another while permitting misalignment thereof, comprising a pair of thrust elements having portions of their faces in point contact at all times, one of the elements being carried by the driving member and having a convex thrust face and the other element being carried by the driven hub and having a flat thrust face, said point contact between said convex and flat thrust faces lying in the plane which passes through the center of said spherical gear midway between the ends of the teeth thereof.

REINHOLD W. DYKMAN.
CHARLES A. HAUBROE.

REFERENCES CITED

The following references are of record in the file of this patent:

UNITED STATES PATENTS

| Number | Name | Date |
|---|---|---|
| 1,770,744 | Morgan | July 15, 1930 |
| 2,136,947 | Morgan | Nov. 15, 1938 |